(12) United States Patent
Mahgerefteh et al.

(10) Patent No.: US 7,941,057 B2
(45) Date of Patent: May 10, 2011

(54) INTEGRAL PHASE RULE FOR REDUCING DISPERSION ERRORS IN AN ADIABATICALLY CHIRPED AMPLITUDE MODULATED SIGNAL

(75) Inventors: Daniel Mahgerefteh, Palo Alto, CA (US); Parviz Tayebati, Boston, MA (US); Xueyan Zheng, Andover, MA (US); Yasuhiro Matsui, Woburn, MA (US)

(73) Assignee: Finisar Corporation, Sunnyvale, CA (US)

( * ) Notice: Subject to any disclaimer, the term of this patent is extended or adjusted under 35 U.S.C. 154(b) by 667 days.

(21) Appl. No.: 11/964,321

(22) Filed: Dec. 26, 2007

(65) Prior Publication Data

US 2008/0159747 A1    Jul. 3, 2008

Related U.S. Application Data

(60) Provisional application No. 60/877,425, filed on Dec. 28, 2006.

(51) Int. Cl.
*H04B 10/04* (2006.01)
*H04B 10/12* (2006.01)

(52) U.S. Cl. ......... 398/193; 398/183; 398/185; 398/199
(58) Field of Classification Search ........... 398/183, 398/185, 193, 199
See application file for complete search history.

(56) References Cited

U.S. PATENT DOCUMENTS

| | | | |
|---|---|---|---|
| 3,324,295 A | 6/1967 | Harris | |
| 3,973,216 A | 8/1976 | Hughes et al. | |
| 3,999,105 A | 12/1976 | Archey et al. | |
| 4,038,600 A | 7/1977 | Thomas et al. | |
| 4,561,119 A | 12/1985 | Epworth | |
| 4,671,604 A | 6/1987 | Soref | |
| 4,754,459 A | 6/1988 | Westbrook | |
| 4,805,235 A | 2/1989 | Henmi | |
| 4,841,519 A | 6/1989 | Nishio | |
| 4,896,325 A | 1/1990 | Coldren | |
| 4,914,667 A | 4/1990 | Blonder et al. | |
| 5,088,097 A | 2/1992 | Ono et al. | |
| 5,119,393 A | 6/1992 | Oka et al. | |
| 5,136,598 A | 8/1992 | Weller et al. | |
| 5,177,630 A | 1/1993 | Goutzoulis et al. | |
| 5,293,545 A | 3/1994 | Huber | |
| 5,325,378 A | 6/1994 | Zorabedian | |
| 5,325,382 A | 6/1994 | Emura et al. | |

(Continued)

FOREIGN PATENT DOCUMENTS

CN    1236891    12/1999

(Continued)

OTHER PUBLICATIONS

Alexander et al., Passive Equalization of Semiconductor Diode Laser Frequency Modulation, Journal of Lightwave Technology, Jan. 1989, 11-23, vol. 7, No. 1.

(Continued)

*Primary Examiner* — Nathan M Curs
(74) *Attorney, Agent, or Firm* — Maschoff Gilmore & Israelsen

(57) ABSTRACT

An optical transmitter is disclosed for transmitting a signal along a dispersive medium to a receiver. The optical transmitter generates adiabatically chirped profile having an initial pulse width and frequency excursion chosen such that high frequency data sequences include one bits that interfere destructively at a middle point of an intervening zero bit upon arrival at the receiver.

18 Claims, 3 Drawing Sheets

U.S. PATENT DOCUMENTS

| | | | |
|---|---|---|---|
| 5,371,625 A | 12/1994 | Wedding et al. |
| 5,412,474 A | 5/1995 | Reasenberg et al. |
| 5,416,629 A | 5/1995 | Huber |
| 5,434,693 A | 7/1995 | Tanaka et al. |
| 5,450,432 A | 9/1995 | Okuda |
| 5,459,799 A | 10/1995 | Weber |
| 5,465,264 A | 11/1995 | Buhler et al. |
| 5,477,368 A | 12/1995 | Eskildsen et al. |
| 5,550,667 A | 8/1996 | Krimmel et al. |
| 5,568,311 A | 10/1996 | Matsumoto |
| 5,592,327 A | 1/1997 | Gabl et al. |
| 5,696,859 A | 12/1997 | Onaka et al. |
| 5,737,104 A | 4/1998 | Lee et al. |
| 5,777,773 A | 7/1998 | Epworth et al. |
| 5,805,235 A | 9/1998 | Bedard |
| 5,856,980 A | 1/1999 | Doyle et al. |
| 5,920,416 A | 7/1999 | Beylat et al. |
| 5,946,129 A | 8/1999 | Xu et al. |
| 5,953,139 A | 9/1999 | Nemecek et al. |
| 5,953,361 A | 9/1999 | Borchert |
| 5,974,209 A | 10/1999 | Cho et al. |
| 5,991,323 A | 11/1999 | Adams et al. |
| 6,018,275 A | 1/2000 | Perrett et al. |
| 6,081,361 A | 6/2000 | Adams et al. |
| 6,088,373 A | 7/2000 | Hakki |
| 6,096,496 A | 8/2000 | Frankel |
| 6,104,851 A | 8/2000 | Mahgerefteh |
| 6,115,403 A | 9/2000 | Brenner et al. |
| 6,157,025 A | 12/2000 | Katagiri et al. |
| 6,188,499 B1 | 2/2001 | Majima |
| 6,222,861 B1 | 4/2001 | Kuo et al. |
| 6,271,959 B1 | 8/2001 | Kim et al. |
| 6,282,003 B1 | 8/2001 | Logan et al. |
| 6,298,186 B1 | 10/2001 | He |
| 6,331,991 B1 | 12/2001 | Mahgerefteh |
| 6,351,585 B1 | 2/2002 | Amundson et al. |
| 6,359,716 B1 | 3/2002 | Taylor |
| 6,421,151 B1 | 7/2002 | Berger |
| 6,459,518 B1 | 10/2002 | Suzuki et al. |
| 6,473,214 B1 | 10/2002 | Roberts et al. |
| 6,486,440 B1 | 11/2002 | Crafts et al. |
| 6,506,342 B1 | 1/2003 | Frankel |
| 6,522,809 B1 | 2/2003 | Takabayashi et al. |
| 6,353,623 B1 | 3/2003 | Munks |
| 6,563,623 B1 | 5/2003 | Penninckx et al. |
| 6,577,013 B1 | 6/2003 | Glenn et al. |
| 6,580,739 B1 | 6/2003 | Coldren |
| 6,618,513 B2 | 9/2003 | Evankow, Jr. |
| 6,628,690 B1 | 9/2003 | Fish et al. |
| 6,650,667 B2 | 11/2003 | Nasu et al. |
| 6,654,564 B1 | 11/2003 | Colbourne et al. |
| 6,658,031 B2 | 12/2003 | Tuganov et al. |
| 6,665,351 B2 | 12/2003 | Hedberg et al. |
| 6,687,278 B1 | 2/2004 | Mason et al. |
| 6,690,686 B2 | 2/2004 | Delfyett |
| 6,738,398 B2 | 5/2004 | Hirata |
| 6,748,133 B2 | 6/2004 | Liu et al. |
| 6,778,307 B2 | 8/2004 | Clark |
| 6,785,308 B2 | 8/2004 | Dyer et al. |
| 6,810,047 B2 | 10/2004 | Oh et al. |
| 6,834,134 B2 | 12/2004 | Brennan et al. |
| 6,836,487 B1 | 12/2004 | Farmer et al. |
| 6,847,758 B1 | 1/2005 | Watanabe |
| 6,943,951 B2 | 9/2005 | Kikuchi et al. |
| 6,947,206 B2 | 9/2005 | Tsadka et al. |
| 6,963,685 B2 | 11/2005 | Mahgerefteh et al. |
| 7,013,090 B2 | 3/2006 | Adachi et al. |
| 7,027,470 B2 | 4/2006 | May |
| 7,054,538 B2 | 5/2006 | Mahgerefteh et al. |
| 7,073,956 B1 | 7/2006 | Shin et al. |
| 7,076,170 B2 | 7/2006 | Choa |
| 7,123,846 B2 | 10/2006 | Tateyama et al. |
| 7,164,865 B2 | 1/2007 | Tatsuno et al. |
| 7,187,821 B2 | 3/2007 | Matsui et al. |
| 7,263,291 B2 | 8/2007 | Mahgerefteh et al. |
| 7,280,721 B2 | 10/2007 | McCallion et al. |
| 7,352,968 B2 | 4/2008 | Tayebati |
| 7,356,264 B2 | 4/2008 | Mahgerefteh et al. |
| 7,376,352 B2 | 5/2008 | Tayebati |
| 7,406,266 B2 | 7/2008 | Mahgerefteh et al. |
| 7,406,267 B2 | 7/2008 | Johnson et al. |
| 7,433,605 B2 | 10/2008 | Mahgerefteh et al. |
| 7,474,859 B2 | 1/2009 | Mahgerefteh et al. |
| 7,477,851 B2 | 1/2009 | Mahgerefteh et al. |
| 7,480,464 B2 | 1/2009 | McCallion et al. |
| 7,492,976 B2 | 2/2009 | Mahgerefteh et al. |
| 7,502,532 B2 | 3/2009 | McCallion et al. |
| 7,505,694 B2 | 3/2009 | Johnson et al. |
| 7,515,626 B2 | 4/2009 | Lee et al. |
| 7,536,113 B2 | 5/2009 | Matsui et al. |
| 7,542,683 B2 | 6/2009 | Matsui et al. |
| 7,555,225 B2 * | 6/2009 | Mahgerefteh et al. ........ 398/185 |
| 7,558,488 B2 | 7/2009 | Matsui et al. |
| 7,564,889 B2 | 7/2009 | Matsui et al. |
| 7,609,977 B2 | 10/2009 | Matsui et al. |
| 7,613,401 B2 | 11/2009 | Matsui et al. |
| 7,616,902 B2 | 11/2009 | Mahgerefteh et al. |
| 7,630,425 B2 | 12/2009 | Tayebati et al. |
| 7,639,955 B2 | 12/2009 | Zheng et al. |
| 7,657,179 B2 | 2/2010 | Mahgerefteh et al. |
| 7,663,762 B2 | 2/2010 | Mahgerefteh et al. |
| 7,697,186 B2 | 4/2010 | McCallion et al. |
| 7,697,847 B2 | 4/2010 | Matsui et al. |
| 7,742,542 B2 | 6/2010 | Mahgerefteh et al. |
| 7,760,777 B2 | 7/2010 | Matsui et al. |
| 7,778,295 B2 | 8/2010 | Matsui et al. |
| 7,809,280 B2 | 10/2010 | Mahgerefteh et al. |
| 2001/0012430 A1 | 8/2001 | Usami et al. |
| 2001/0048705 A1 | 12/2001 | Kitaoka et al. |
| 2002/0002099 A1 | 1/2002 | Hara et al. |
| 2002/0012369 A1 | 1/2002 | Nasu et al. |
| 2002/0044738 A1 | 4/2002 | Jablonski |
| 2002/0048290 A1 | 4/2002 | Tanaka et al. |
| 2002/0063930 A1 | 5/2002 | Blauvelt |
| 2002/0131047 A1 | 9/2002 | Zarrabian et al. |
| 2002/0154372 A1 | 10/2002 | Chung et al. |
| 2002/0159490 A1 | 10/2002 | Karwacki |
| 2002/0176659 A1 | 11/2002 | Lei et al. |
| 2003/0002120 A1 | 1/2003 | Choa |
| 2003/0063647 A1 | 4/2003 | Yoshida et al. |
| 2003/0067952 A1 | 4/2003 | Tsukiji et al. |
| 2003/0077031 A1 | 4/2003 | Zhang et al. |
| 2003/0099018 A1 | 5/2003 | Singh et al. |
| 2003/0147114 A1 | 8/2003 | Kang et al. |
| 2003/0161370 A1 | 8/2003 | Buimovich et al. |
| 2003/0169787 A1 | 9/2003 | Vergaftman et al. |
| 2003/0193974 A1 | 10/2003 | Frankel et al. |
| 2003/0210912 A1 | 11/2003 | Leuthold |
| 2004/0008933 A1 | 1/2004 | Mahgerefteh et al. |
| 2004/0008937 A1 | 1/2004 | Mahgerefteh et al. |
| 2004/0036943 A1 | 2/2004 | Freund et al. |
| 2004/0076199 A1 | 4/2004 | Wipiejewski et al. |
| 2004/0081386 A1 | 4/2004 | Morse et al. |
| 2004/0096221 A1 | 5/2004 | Mahgerefteh et al. |
| 2004/0218890 A1 | 11/2004 | Mahgerefteh et al. |
| 2004/0234200 A1 | 11/2004 | Jennings et al. |
| 2005/0100345 A1 | 5/2005 | Welch et al. |
| 2005/0111852 A1 | 5/2005 | Mahgerefteh et al. |
| 2005/0152702 A1 | 7/2005 | Mahgerefteh et al. |
| 2005/0163512 A1 | 7/2005 | Tayebati et al. |
| 2005/0169638 A1 | 8/2005 | Tayebati et al. |
| 2005/0169642 A1 | 8/2005 | Mahgerefteh et al. |
| 2005/0175356 A1 | 8/2005 | McCallion et al. |
| 2005/0206989 A1 | 9/2005 | Marsh |
| 2005/0213993 A1 | 9/2005 | Kazemi-Nia et al. |
| 2005/0249509 A1 | 11/2005 | Nagarajan et al. |
| 2005/0271394 A1 | 12/2005 | Whiteaway et al. |
| 2005/0286829 A1 | 12/2005 | Mahgerefteh et al. |
| 2005/0286909 A1 | 12/2005 | Kish et al. |
| 2006/0002718 A1 | 1/2006 | Matsui et al. |
| 2006/0008272 A1 | 1/2006 | Abeles et al. |
| 2006/0018666 A1 | 1/2006 | Matsui et al. |
| 2006/0029358 A1 * | 2/2006 | Mahgerefteh et al. ......... 386/33 |
| 2006/0029396 A1 | 2/2006 | Mahgerefteh et al. |
| 2006/0029397 A1 | 2/2006 | Mahgerefteh et al. |
| 2006/0120416 A1 | 6/2006 | Hu et al. |
| 2006/0193636 A1 | 8/2006 | Katagiri et al. |

| | | |
|---|---|---|
| 2006/0228120 A9 | 10/2006 | McCallion et al. |
| 2006/0233556 A1 | 10/2006 | Mahgerefteh et al. |
| 2006/0239306 A1 | 10/2006 | Donanhoe |
| 2006/0274993 A1 | 12/2006 | Mahgerefteh et al. |
| 2007/0286608 A1 | 12/2007 | Matsui et al. |
| 2008/0002990 A1 | 1/2008 | McCallion et al. |
| 2008/0037608 A1 | 2/2008 | Zhou et al. |
| 2008/0166134 A1 | 7/2008 | McCallion et al. |
| 2008/0181619 A1 | 7/2008 | Heismann |
| 2008/0187325 A1 | 8/2008 | McCallion et al. |
| 2008/0193132 A1 | 8/2008 | Matsui et al. |
| 2008/0193144 A1 | 8/2008 | Zhou et al. |
| 2008/0240180 A1 | 10/2008 | Matsui et al. |
| 2008/0247763 A1 | 10/2008 | Mahgerefteh et al. |
| 2008/0247765 A1 | 10/2008 | Mahgerefteh et al. |
| 2008/0291950 A1 | 11/2008 | McCallion et al. |
| 2009/0003842 A1 | 1/2009 | Mahgerefteh et al. |
| 2009/0060526 A1 | 3/2009 | Matsui et al. |
| 2009/0080905 A1 | 3/2009 | Olsson |
| 2009/0196631 A1 | 8/2009 | Daghighian et al. |
| 2009/0238224 A1 | 9/2009 | Ye |
| 2009/0269069 A1 | 10/2009 | Mahgerefteh et al. |
| 2010/0008679 A1 | 1/2010 | Cole |
| 2010/0098436 A1 | 4/2010 | Mahgerefteh et al. |

FOREIGN PATENT DOCUMENTS

| | | |
|---|---|---|
| EP | 052758 | 7/1992 |
| EP | 602659 | 6/1994 |
| GB | 2 107 147 | 4/1983 |
| JP | 58-075340 | 5/1983 |
| JP | 62-189832 | 8/1987 |
| JP | 09-214427 | 8/1997 |
| JP | 11-031859 | 2/1999 |
| JP | 2000105313 | 4/2000 |
| JP | 2001-036477 | 2/2001 |
| JP | 2001-284711 | 10/2001 |
| JP | 2001291928 | 10/2001 |
| JP | 2001320328 | 11/2001 |
| JP | 2002243935 | 8/2002 |
| JP | 2002267834 | 9/2002 |
| JP | 2002267998 | 9/2002 |
| JP | 2002-311235 | 10/2002 |
| WO | 9905804 | 2/1999 |
| WO | 0104999 | 1/2001 |
| WO | WO 0117076 | 3/2001 |
| WO | WO 0118919 | 3/2001 |
| WO | 03005512 | 7/2002 |

OTHER PUBLICATIONS

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Hyryniewicz, J.V., et al., Higher Order Filter Response in Coupled Microring Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in Microring Resonators, Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutal1 et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Matsui, Yasuhiro et al, Chirp-Managed Directly Modulated Laser (CML), IEEE Photonics Technology Letters, Jan. 15, 2006, pp. 385-387, vol. 18, No. 2.

Nakahara, K. et al, 40-Gb/s Direct Modulation With High Extinction Ratio Operation of 1.3-μm InGaAl As Multiquantum Well Ridge Waveguide Distributed Feedback Lasers, IEEE Photonics Technology Leters, Oct. 1, 2007, pp. 1436-1438, vol. 19 No. 19.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

EP 05764209.2, Jun. 9, 2009, Exam Report.

CN 200580037807, May 27, 2010, Office Action.

CN 200580012705.4, Mar. 29, 2010, Office Action

CN 200580015245.0, Sep. 25, 2009, Office Action.

CN 200580015245.0, Mar. 29, 2010, Office Action.

CN 200880009551.7, Jul. 14, 2010, Office Action.

EP 05731268.8, Jan. 16, 2008, Office Action.

EP 05731268.8, May 12, 2010, Office Action.

Dischler, Roman, Buchali, Fred, Experimental Assessment of a Direct Detection Optical OFDM System Targeting 10Gb/s and Beyond, Optical Fiber Communication/National Fiber Optic Engineers Conference, Feb. 24-28, 3 pages, San Diego, CA., 2008.

Dong Jae Shin, et al., Low-cost WDM-PON with Colorless Bidirectional Tranceivers, Journal of Lightwave Technology, Jan. 2006, pp. 158-165, vol. 24, No. 1.

Kikuchi, Nobuhiko, et al., Experimental Demonstration of Incoherent Optical Multilevel Staggered-APSK (Amplitude- and Phase-Shift Keying) Signaling, Optical Fiber Communication/National Fiber Optic Engineers Conference, Feb. 24-28, 2008, 3 pages, San Diego, CA.

Kiyoshi Fukuchi, Proposal and Feasibility Study of a 6-level PSK modulation format based system for 100 Gg/s migration, 2007, 3 pages.

Lammert et al., MQW DBR Lasers with Monolithically Integrated External-Cavity Electroabsorption Modulators Fabricated Without Modification of the Active Region, IEEE Photonics Technology Letters, vol. 9, No. 5, May 1997, pp. 566-568.

Mahgerefteh, D. and Fan, F., Chirp-managed-laser technology delivers > 250-km reach, Lightwave Online, 2005, PennWell Corporation. Accessed online Jul. 1, 2009 at: http://www.finisar.com/download_31wMeaCML_Application%20White%20Paper-LW.pdf.

Ronald Freund, Dirk Daniel Gross, Matthias Seimetz, Lutz Molle, Christoph Casper, 30 Gbit/s RZ 8-PSK Transmission over 2800 km Standard Single Mode Fibre without Inline Dispersion Compensation, 2007, 3 pages.

Tokle, Torger et al., Advanced Modulation Formats for Transmission Systems, Optical Fiber Communication/National Fiber Optic Engineers Conference, Feb. 24-28, 2008, 3 pages, San Diego, CA.
Sekine, Kenro, et al., Advanced Multi-level Transmission Systems, Optical Fiber Communication/National Fiber Optic Engineers Conference, Feb. 24-28, 2008, 3 pages, San Diego, CA.
KR 102008-7027139, Apr. 28, 2010, Office Action.
JP 2009-504345, Apr. 27, 2010, Office Action.
JP2004-551835, Jul. 18, 2008, Office Action.
JP2004-551835, Mar. 2, 2010, Office Action.
CN 200380108289.9, Nov. 23, 2007, Office Action.
CN 200380108289.9, Aug. 29, 2008, Office Action.
CN 200380108289.9, Nov. 21, 2008, Office Action.
CA 2510352, Mar. 17, 2020, Office Action.
U.S. Appl. No. 11/964,315, mail date Aug, 25, 2010, Office Action.
U.S. Appl. No. 12/115,337, mail date Mar. 4, 2010, Office Action.
U.S. Appl. No. 12/115,337, mail date Aug. 20, 2010, Office Action.
U.S. Appl. No. 12/047,017, mail date Jun. 1, 2010, Restriction Requirement.
U.S. Appl. No. 12/047,017, mail date Aug. 6, 2010, Office Action.
U.S. Appl. No. 12/053,344, mail date Sep. 3, 2010, Notice of Allowance.
U.S. Appl. No. 12/047,017, mail date Sep. 27, 2010, Notice of Allowance.
U.S. Appl. No. 12/025,573, mail date Oct. 6, 2010, Office Action.
U.S. Appl. No. 12/014,676, mail date Oct. 4, 2010, Office Action.
U.S. Appl. No. 12/115,337, mail date Oct. 28, 2010, Notice of Allowance.
JP 2009-504345, Oct. 26, 2010, Office Action.

\* cited by examiner

US 7,941,057 B2

INTEGRAL PHASE RULE FOR REDUCING DISPERSION ERRORS IN AN ADIABATICALLY CHIRPED AMPLITUDE MODULATED SIGNAL

CROSS-REFERENCE TO RELATED APPLICATIONS

The Application claims the benefit of U.S. Provisional Patent Application Ser. No. 60/877,425, filed Dec. 28, 2006.

BACKGROUND OF THE INVENTION

1. The Field of the Invention

The present invention relates to dispersion resistant digital optical transmitters.

2. The Relevant Technology

The quality and performance of a digital transmitter is determined by the distance over which the transmitted digital signal can propagate without severe distortions. This is typically characterized as the distance over which a dispersion penalty reaches a level of about 1 dB. A standard 10 Gb/s optical digital transmitter, such as an externally modulated optical source (e.g., a laser), can transmit up to a distance of about 50 km in standard single mode fiber, at 1550 nm, before the dispersion penalty reaches the level of about 1 dB. This distance is typically called the dispersion limit.

The Bit Error Rate (BER) of an optical digital signal after propagation though fiber, and the resulting distortion of the signal, are determined mostly by the distortions of a few bit sequences. The 101 bit sequence, and the single bit 010 sequence, are two examples of bit sequences that have high frequency content and tend to distort most after dispersion in a fiber, leading to errors in the bit sequence. Transmission techniques that can alleviate the distortion for these bit sequences increase the dispersion tolerance of the entire data pattern.

In view of the foregoing it would be advancement in the art to provide an apparatus and method for increasing the dispersion tolerance of an optical digital transmitter, particularly for high-frequency data.

BRIEF SUMMARY OF THE INVENTION

In one aspect of the invention, an optical transmission system includes an optical transmitter, an optical receiver, and an optical fiber having a first end coupled to the optical transmitter and a second end coupled to the optical receiver. The optical fiber includes a dispersive material and defines an optical path length between the first and second ends. The optical transmitter includes a laser transmitter operable to emit a digital signal comprising a train of zero and one bits, the one bits comprising adiabatic pulses. The pulses have an adiabatic frequency excursion between a base frequency and a peak frequency.

The train of zero and one bits may include a high frequency sequence comprising a first one bit followed by a zero bit followed by a second one bit. The frequency excursion has a value such that the phase difference between the first one bit and the second one bit at a middle point of the zero bit between them is between $\pi/2$ and $-\pi/2$ radians when the bit sequence arrives at the receiver.

In another aspect of the invention, the adiabatically chirped pulses of the one bits have a $1/e^2$ pulse width $\tau_0$ upon exiting the transmitter and a $1/e^2$ pulse width pulse width $\tau$ upon traveling to the receiver through the optical fiber. The frequency excursion ($\Delta v_{AD}$) between the base frequency and the peak frequency approximately satisfies the relation $\Delta v_{AD}(\tau-\tau_0)\mathrm{erf}(1)=\frac{1}{4}$ such that the 1 bits interfere destructively at a middle point of an intervening zero bit having a duration T.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
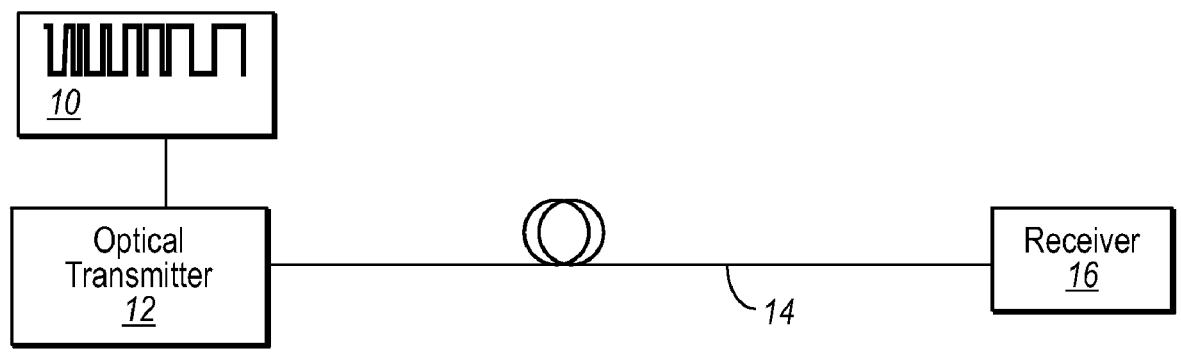
FIG. 1 is a schematic block diagram of a laser transmitter suitable for use in accordance with an embodiment of the present invention.

Referring to FIG. 1, a digital signal source 10 supplies an electrical digital bit sequence to an optical transmitter 12, such as a laser. The output of the optical transmitter 12 is transmitted through a dispersive medium, such as an optical fiber 14. A receiver 16 is coupled to an end of the optical fiber 14 and receives optical signals transmitted from the transmitter 12. The optical fiber 14 defines an optical path length between the optical transmitter 12 and the receiver 16.

The optical transmitter 12 may be a directly frequency modulated laser coupled to an optical spectrum reshaper, such as is used in the commercially available Chirp Managed Laser (CML™). Alternatively, the transmitter 12 includes a directly modulated distributed feedback (DFB) laser for FM generation and a separate amplitude modulator (AM). In the preferred embodiment of the present invention, the optical transmitter generates optical pulses that are amplitude modulated and frequency modulated such that the temporal frequency modulation profile of the pulses substantially follows the temporal amplitude modulation profile. We call these pulses adiabatically chirped amplitude modulated pulses (ACAM).

Dispersion tolerance of pulses generated by the optical signal source 12 are enhanced when pulses have a flat-top chirp and the adiabatic chirp is chosen to produce a $\pi$ phase shift between 1 bits separated by odd number of 0 bits. This is evident by considering a 101 bit sequence. In this case, as the 1 bits spread in time, they interfere destructively in the middle due to the uniform $\pi$ phase shift across the pulse. Accordingly, the dispersion tolerance tends to be relatively independent of distance, because the phase across each pulse is constant and any overlap is adding destructively.

In a pulse generated according to embodiments of the present invention, the optical transmitter 12 is modulated to produce an adiabatically chirped amplitude modulated (ACAM) pulse sequence that manifests superior dispersion tolerance. In some embodiments, the chirp is not flat-topped, but varies adiabatically with the amplitude of the pulse. Hence the phase across the pulse is not constant and is varying.

The adiabatic chirp and the crossing percentage can be arranged according to a novel integral rule, described below, to optimize transmission at a particular distance. Optical cross over is a convenient representation of the pulse duty cycle for a random digital bit sequence, and is defined below. For example, for a 100% duty cycle pulse, where the single 1 bit duration is equal to the bit period, the cross-over is 50%.

Digital data consists of 1s and 0s, at a bit rate, B=1/T, where T is the bit period. For a B=10 Gb/s system, T=100 ps. The 1 and 0 bits each occupy time durations $\Box_1$, and $\Box_0$ respectively, such that $$\Box_1 + \Box_0 = 2T. \tag{1}$$

The duty cycle is defined as the fraction of the duration of the 1s to twice the bit period;

$$D = \Box_1 / 2T. \tag{2}$$

Figure 2:
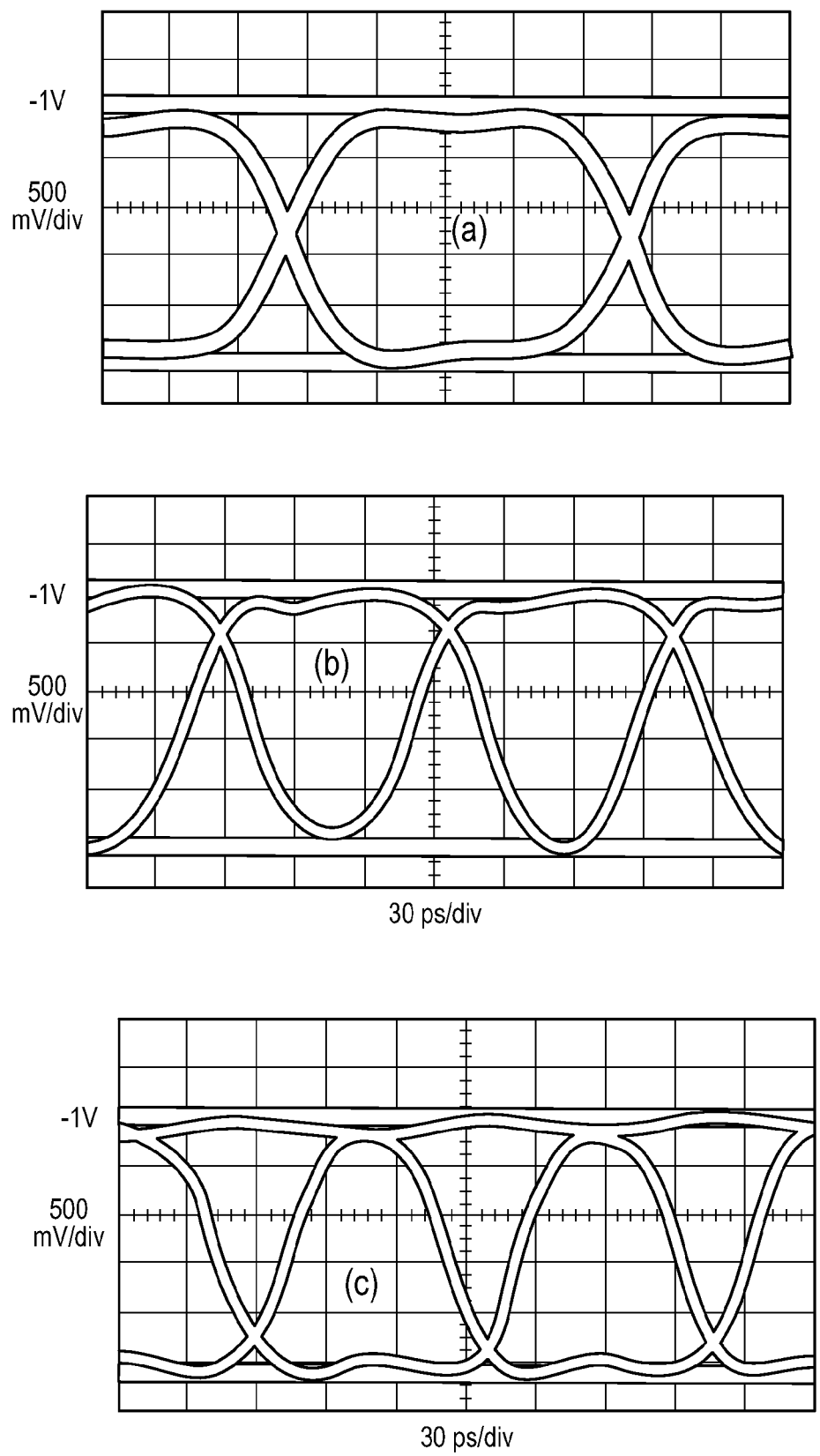
FIG. 2 is an eye diagram representation of a pseudo-random sequence of ones and zeros with various duty cycle values at 10 Gb/s.

A non-return-to-zero digital data stream is often shown on a sampling oscilloscope in the form of an "eye diagram,", as in FIG. 2, in which all the bits in the bit stream are folded on top of each other on the same two bit periods. In the eye diagram, the rising edge of a 1 bit crosses the falling edge of another bit at a point along the vertical amplitude axis, as used in this application is called the crossing point, which is determined by the duty cycle and the rise and fall times. For a bit stream having 50% duty cycle, the crossing point is in the middle between the 1 level and the zero level, or 50%. The crossing point moves above 50% for duty cycle higher than 50% (1s pulses longer than the bit period) and moves below 50% for duty cycle less than 50% (1s pulses shorter than the bit period). FIG. 2 shows a 50% duty cycle with a 50% crossing point (a), a 60% duty cycle (b), and a 40% duty cycle (c).

In some embodiments, pulses are formed according to an integral rule such that the phase difference between the peaks of two 1 bits separated by a 0 bit are adjusted such that the phase difference between the two pulses in the middle of the 0 bit becomes equal to π at a desired propagation distance. This guarantees that the interference of the 1 bits in the middle of the 0 bit, which is separating them, is maximally destructive, leading to a minimum at the desired distance. This causes the phase margin near the 0 bit and the extinction ratio to increase with propagation distance.

For a fixed crossing percentage, the optimum adiabatic chirp decreases with increasing propagation distance. Also optimum chirp increases for higher crossing percentage. It should be noted that the integral rule assumes that the bit sequence limiting propagation is the 101 bit sequence. So the optimum conditions of the transmitter may be somewhat different to accommodate other limiting bit sequences. For example, single 1 bits spread less if they have higher crossing (longer 1s width). So it is advantageous to use a high crossing. However, the 101 bit should still maintain integrity for lower crossing, as long as the integral rule is satisfied.

Figure 3:
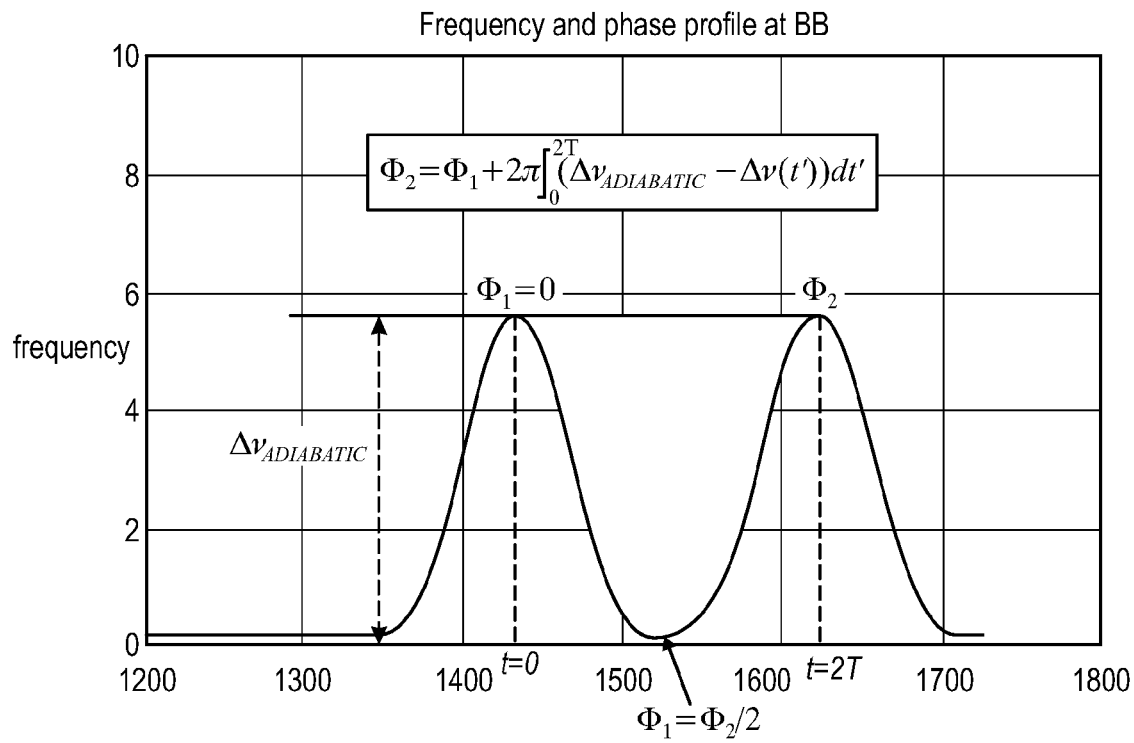
FIG. 3 is a graph illustrating adiabatically chirped pulse shapes as transmitted from a laser transmitter.

FIG. 3 illustrates the instantaneous frequency of a 101 sequence of an ACAM signal. It is assumed for this model that there is either minimal or no transient chirp. It is also assumed that the amplitude (not shown) has the same profile as the frequency. Since absolute phase is arbitrary, the phase of the first bit, $E_1$ is assumed to be zero at its peak, which we take to be at t=0. The phase at time t relative to this point is given by $$\Phi = 2\pi \int_0^t (\Delta v_{AD} - \Delta v(t')) \, dt' \tag{1}$$

Where $\Delta v_{AD}$ is the adiabatic chirp, defined as peak frequency excursion of the frequency profile of the pulse, and $\Delta v(t)$ is the time varying instantaneous frequency profile of the pulse. For example, as shown in FIG. 3, the phase difference between the peaks of the first 1 bit, $E_1$ and the second 1 bit, $E_2$ is given by the shaded area, where T is the bit period. This phase difference is a function of the adiabatic chirp, rise times, fall time, and pulse shape.

This ACAM signal can be generated by a variety of ways, including using a directly frequency modulated laser coupled to an optical spectrum reshaper, such as is used in the commercially available Chirp Managed Laser (CML™). The ACAM signal may be generated by an independent distributed feedback (DFB) laser for FM generation and a separate amplitude modulator placed after the laser modulator. When the frequency modulation is generated by a DFB laser, the resulting output field has continuous phase. Hence the phase in the center of the 0 bit between the two 1 bits is ½ the phase difference between the peaks of $E_1$ and $E_2$.

Upon propagation through a dispersive fiber, the pulses broaden and their wings overlap. The instantaneous frequency of the pulses has two contributions: 1) the adiabatic chirp of the original pulse, and 2) the linear chirp introduced by fiber dispersion, which introduces a quadratic phase variation across the pulse. In the absence of adiabatic chirp this quadratic phase is the same for the two 1 bit pulses in the 101 sequence. Because of the quadratic symmetry, the dispersion-induced phase is the same for the $E_1$ and $E_2$ pulses in the middle of the 0 bit between the 1 bits, where they overlap. Hence the overlapped pulses interfere constructively, causing the 0 level to rise at the 0 bit and increase the 0→1 bit error rate. This is a key feature of the distorted eye for a chirp-free externally modulated transmitter after fiber propagation.

Figure 4:
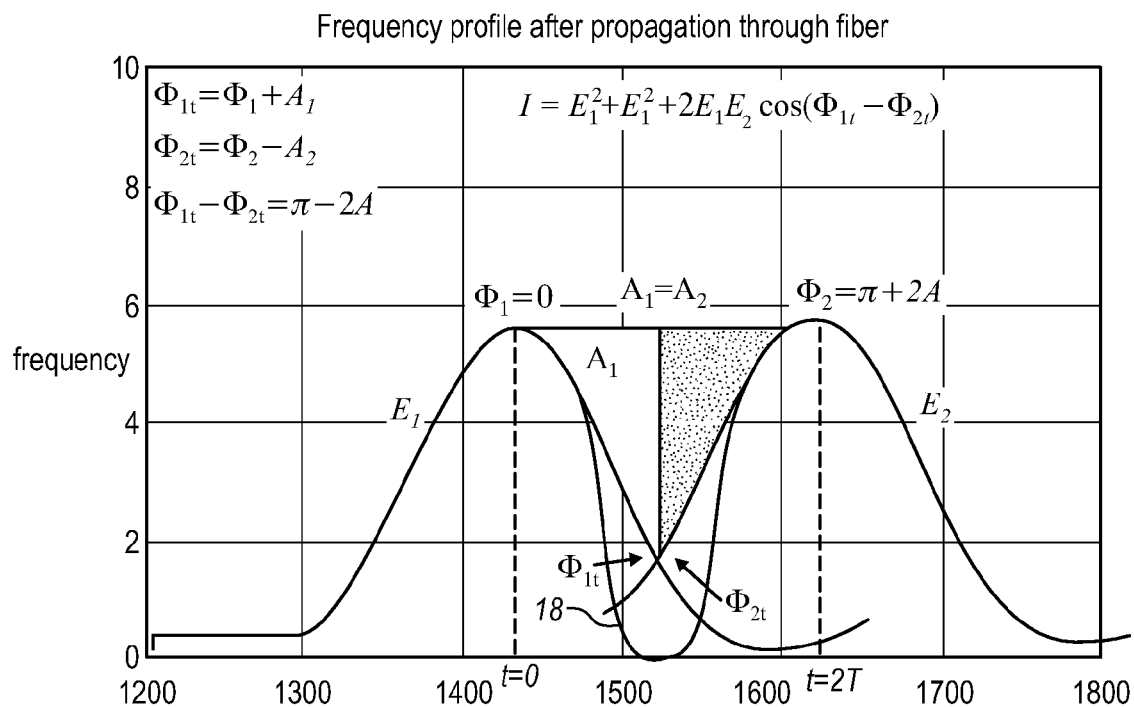
FIG. 4 is a graph illustrating adiabatically chirped pulses shaped in accordance to an embodiment of the present invention after traveling through a dispersive medium.

FIG. 4 shows the frequency profile of an adiabatically chirped amplitude modulated signal (ACAM) after fiber dispersion. The amplitude (not shown separately) is the same as the frequency profile. The linear chirp introduced by dispersion, which would introduce a tilt, is not shown. The two 1 bit pulses overlap in the middle of the zero bit, t=T, and interfere. We neglect the dispersion-induced phase for the moment, because it gives the same phase to the two pulses at t=T. Adiabatic chirp, on the other hand will introduce a phase difference, which can be adjusted to cause cancellation. Note that if the adiabatic chirp is high enough, it will cause the pulse to broaden asymmetrically. The method presented here still applies. However the cancellation occurs away from the center of the 0 bit between the two bits. This is evident, for example when the adiabatic chirp is 7-8 GHz for a 10 Gb/s bit sequence.

The curve 18 of FIG. 4 shows the intensity of the sum of the square of the fields when there is a π phase shift between them in the middle of the 0 bit. The resulting intensity is given by Equation 2

$$I(t) = E_1^2(t) + E_2^2(t) + 2E_1^*(t)E_2(t)\cos(\Phi_{1t} - \Phi_{2t}) \tag{2}$$

Here $\Phi_{1t}$ and $\Phi_{2t}$ are the phases of the field at time t for the 1 bits, $E_1$ and $E_2$. In order to have destructive interference, the phase difference has to be ideally π, however, any value in the range $\pi/2 \leq \Phi_{2t} - \Phi_{1t} \leq -\pi/2$ (modulo 2π) will cause some destructive interference since the cosine function is negative in this range. This accounts for the large range of usable distances, and adiabatic chirp values for which the resulting optical eye is relatively open and the BER is acceptably low. Using Eq. 1 the phases at t=T are given in terms of the shaded areas $A_1$ and $A_2$ to be $$\Phi_{1t}=\Phi_1+A_1=A_1 \quad (2)$$

$$\Phi_{2t}=\Phi_2-A_2 \quad (3)$$

In the case that the pulses broaden approximately symmetrically, $A_1=A_2$, the condition for destructive interference becomes $$\Phi_{2t}-\Phi_{1t}=\Phi_2-2A(z)\approx\pi \quad (4)$$

According to Eq. 4, optimum cancellation is achieved when the phase difference between the peaks of two 1 bits separated by a zero is given by $$\Phi_2 = 2\pi\Delta v_{AD}\int_0^{2T}(1-\Delta v(t')/\Delta v_{AD})dt' \quad (5)$$
$$= \pi + 2A(z)$$

Note that the phase difference, $\Phi_2$, between the two 1 bits separated by a single 0 bit, has to be larger than $\pi$ in order to get cancellation at distance z. This is distinctly different from the case of flat-top chirp, in which the phase difference is equal to $\pi$. It is interesting to note that since the phase difference has to be $\pi$ modulo $2\pi$, that phase difference $2A(z)-\pi$ will also provide a cancellation at the middle of the pulses. In Eq. 5, the integral is a dimensionless factor, which depends only on the pulse shape, rise time and fall times. This factor decreases with increasing pulse duty cycle; i.e. increasing eye crossing percentage. So a higher chirp required for pulses with higher duty cycle (higher crossing percentage) is expected. For experimental conditions using a directly frequency modulated laser coupled to an optical spectrum reshaper, such as the commercially available CML™, we find that for $\Delta v_{AD}$=6.5 GHz, crossing percentage of 55%, rise time ~35 ps, and fall time ~35 ps, which were optimized for 2300 ps/nm dispersion, the phase difference is $\Phi_2$=1.3$\pi$. This value was calculated from a measured pulse shape and assuming adiabatic chirp. For this condition the CML™ gave a $<10^{-6}$ bit error rate at 10.7 Gb/s at 22 dB optical signal to noise ratio (OSNR) after 2300 ps/nm of dispersion and satisfies the industry requirements. It is important to note that the receiver used in the preferred embodiment of the present invention is a standard 10 Gb/s direct detection receiver having a bandwidth of approximately 75% of the bit rate. Also, the optical eye diagram of the resulting signal at the receiver is a standard two-level intensity modulated eye diagram. This is because the destructive interference between bits keeps the optical eye open.

The valley area, between the two overlapping pulses, $A(z)$, decreases with increasing distance, as the pulses broaden. This implies that the optimum adiabatic chirp decreases with increasing distance. For a Gaussian pulse the area, $A(z)$, up to the middle of the zero bit between the two 1 bits, at t=T, can be approximated by $$A(z)=2\pi\Delta v_{AD}(T-\sqrt{\tau_0^2+\beta_2^2 z^2/\tau_0^2}\,erf(T/\tau)) \quad (6)$$

Where $\tau_0$ is the $1/e^2$ pulse width of the 1 bit before propagation, $\tau=\sqrt{\tau_0^2+\beta_2^2 z^2/\tau_0^2}$ is the pulse width after propagation, $\beta_2$ is the fiber dispersion in ps$^2$/km, and z is propagation distance. Substituting Eq. 6 for the area into Eq. 5 for the integral rule for Gaussian pulses to calculate $\Phi_2$ in terms of the adiabatic chirp and initial pulse width, $\tau_0$, we obtain an explicit dependence of optimum adiabatic chirp on pulse width:

$$\Delta v_{AD}(\tau \times erf(T/\tau)-\tau_0 \times erf(T/\tau_0))=\tfrac{1}{4} \quad (7)$$

As an example, according to Eq. 7, for $\tau$=90 ps and $\tau_0$=50 ps, the optimum adiabatic chirp is ~ 7 GHz. It is important to note that $\tau$ is an increasing function of the transmission distance $\tau=\sqrt{\tau_0^2+\beta_2^2 z^2/\tau_0^2}$, and so the optimum chirp according to Eq. 7 will decrease with increasing distance:

$$\Delta v_{AD} = \frac{1}{4}\frac{1}{\left(\sqrt{\tau_0^2+\beta_2^2 z^2/\tau_0^2}\times erf(T/\tau)-\tau_0 \times erf(T/\tau_0)\right)} \quad (8)$$

According to some embodiments of an invention, for a given dispersive medium having an optical path length between the transmitter 12 and the receiver 16, the initial pulse width $\tau_0$ and frequency excursion $\Delta v_{AD}$ are chosen such that Eq. 7 will be satisfied near the receiver, so as to generate a phase shift equal to $\pi$ between 1 bits separated by single 0 bits, for a given pulse width $\tau$ near the receiver 16 after dispersion of the pulse while traveling through the dispersive medium.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transmission system comprising:
   an optical transmitter;
   an optical receiver; and
   a digital signal source coupled to the optical transmitter and operable to generate an electrical data signal effective to cause the optical transmitter to emit a digital signal onto an optical fiber having a first end coupled to the optical transmitter and a second end coupled to the optical receiver, the optical fiber comprising a dispersive material and defining an optical path length between the first and second ends, wherein:
       the digital signal comprises a train of zero and one bits, the one bits comprising adiabatic pulses comprising a frequency excursion between a base frequency and a peak frequency;
       the train of zero and one bits includes a high frequency sequence comprising a first one bit followed by a zero bit followed by a second one bit;
       the frequency excursion has a value such that the first one bit and second one bit are between $\pi/2$ and $-\pi/2$ radians out of phase at a middle point of the zero bit when the high frequency sequence arrives at the receiver so as to decrease the bit error rate of the received digital signal at the receiver;
       the adiabatic pulses have a $1/e^2$ pulse width $\tau_0$ upon exiting the transmitter and a $1/e^2$ pulse width $\tau$ at the receiver after propagation through a length of dispersive fiber; and
       the difference between the base frequency and peak frequency excursion of the pulses at the transmitter approximately satisfies $$\Delta v_{AD}(\tau \times erf(T/\tau)-\tau_0 \times erf(T/\tau_0))=\tfrac{1}{4}.$$

2. The optical transmission system of claim 1, wherein the frequency excursion has a value such that the first one bit and second one bit are about π radians out of phase at a middle point of the zero bit when the high frequency sequence travels a distance equal to the optical path length through the optical fiber.

3. An optical transmission system comprising:
an optical transmitter;
an optical receiver;
an optical fiber having a first end coupled to the optical transmitter and a second end coupled to the optical receiver, the optical fiber comprising a dispersive material and defining an optical path length between the first and second ends; and
a digital signal source coupled to the optical transmitter and operable to generate an electrical data signal effective to cause the optical transmitter to emit a digital signal, wherein:
the digital signal comprises a train of zero and one bits, the one bits comprising adiabatic pulses comprising a frequency excursion between a base frequency and a peak frequency;
the train of zero and one bits includes a high frequency sequence comprising a first one bit followed by a zero bit followed by a second one bit;
the frequency excursion has a value such that the first one bit and second one bit are between $\pi/2$ and $-\pi/2$ radians out of phase at a middle point of the zero bit when the high frequency sequence arrives at the receiver so as to decrease the bit error rate of the received digital signal at the receiver;
the adiabatic pulses have a $1/e^2$ pulse width $\tau_0$ upon exiting the transmitter and a $1/e^2$ pulse width $\tau$ at the receiver after propagation through a length of dispersive fiber; and
the difference between the base frequency and peak frequency excursion of the pulses at the transmitter approximately satisfies $$\Delta v_{AD}(\tau \times \text{erf}(T/\tau) - \tau_0 \times \text{erf}(T/\tau_0)) = \frac{1}{4}.$$

4. The optical transmitter as in claim 1, wherein the frequency excursion between the base frequency and peak frequency excursion of the pulses at the transmitter is a decreasing function of the transmission distance.

5. The optical transmission system of claim 1, wherein the optical transmitter comprises a directly modulated laser.

6. The optical transmission system of claim 1, wherein the optical transmitter comprises a directly frequency modulated laser coupled to an optical spectrum reshaper.

7. The optical transmission system of claim 1, wherein the optical transmitter comprises a distributed feedback laser.

8. The optical transmission system of claim 1, wherein the optical transmitter comprises an independent DFB laser for FM generation and a tandem external modulator for AM generation.

9. The optical transmission system of claim 1, where $\Delta v_{AD}$ is the frequency excursion and T is a bit period of the digital signal.

10. The optical transmission system of claim 3, where $\Delta V_{AD}$ is the frequency excursion and T is a bit period of the digital signal.

11. A method for reducing dispersion-related errors in an optical transmission system comprising an optical fiber coupled to a receiver and having an optical path length, the method comprising:
generating a train of zero and one bits, including a high frequency sequence comprising a first one bit followed by a zero bit followed by a second one bit, the first and second one bits comprising adiabatic pulses having a frequency excursion ($\Delta V_{AD}$) between a base frequency and a peak frequency; and
transmitting the train of zero and one bits through the optical fiber, $\Delta V_{AD}$ having a value such that the first one bit and second one bit are between $\pi/2$ and $-\pi/2$ radians out of phase at a middle point of the zero bit when the high frequency sequence arrives at the receiver;
wherein the adiabatic pulses have a $1/e^2$ pulse width $\tau_0$ upon exiting the transmitter and a $1/e^2$ pulse width $\tau$ at the receiver after propagation through a length of dispersive fiber; and wherein the difference between the base frequency and peak frequency excursion of the pulses at the transmitter approximately satisfies $$\Delta v_{AD}(\tau \times \text{erf}(T/\tau) - \tau_0 \times \text{erf}(T/\tau_0)) = \frac{1}{4}.$$

12. The method of claim 11, wherein the frequency excursion has a value such that the first one bit and second one bit are about π radians out of phase at a middle point of the zero bit when the high frequency sequence arrives at the receiver.

13. The method of claim 11. wherein the frequency excursion between the base frequency and peak frequency excursion of the pulses at the transmitter is a decreasing function of the transmission distance.

14. The method of claim 11, wherein generating the train of zero and one bits comprises modulating a directly modulated laser.

15. The method of claim 11, wherein generating the train of zero and one bits comprises directly modulating a laser coupled to an optical spectrum reshaper.

16. The method of claim 9, wherein generating the train of zero and one bits comprises modulating a distributed feedback laser.

17. The method of claim 9, wherein generating the train of zero and one bits comprises modulating an independent DFB laser for FM generation and a tandem AM modulator.

18. The method of claim 11, where T is a bit period of a digital signal including the train of zero and one bits.

\* \* \* \* \*